United States Patent
Creamer et al.

(10) Patent No.: US 7,184,532 B2
(45) Date of Patent: Feb. 27, 2007

(54) DYNAMIC RINGBACK SERVICES

(75) Inventors: Thomas E. Creamer, Boca Raton, FL (US); Peeyush Jaiswal, Boca Raton, FL (US); Neil A. Katz, Parkland, FL (US); Victor S. Moore, Boynton Beach, FL (US)

(73) Assignee: International Business Machines Corporation, Armonk, NY (US)

( * ) Notice: Subject to any disclaimer, the term of this patent is extended or adjusted under 35 U.S.C. 154(b) by 590 days.

(21) Appl. No.: 10/324,970

(22) Filed: Dec. 20, 2002

(65) Prior Publication Data

US 2004/0120493 A1 Jun. 24, 2004

(51) Int. Cl.
*H04M 3/42* (2006.01)
*H04M 15/00* (2006.01)

(52) U.S. Cl. .............. 379/207.08; 379/114.13
(58) Field of Classification Search ........... 379/207.08, 379/114.13
See application file for complete search history.

(56) References Cited

U.S. PATENT DOCUMENTS

| | | | | |
|---|---|---|---|---|
| 4,551,581 A | * | 11/1985 | Doughty ................ | 379/142.01 |
| 4,691,342 A | * | 9/1987 | Waldron et al. ......... | 379/93.31 |
| 5,048,076 A | * | 9/1991 | Maurer et al. .......... | 379/93.11 |
| 6,005,921 A | * | 12/1999 | Keefe et al. ............. | 379/29.06 |
| 6,038,305 A | * | 3/2000 | McAllister et al. .... | 379/201.02 |
| 6,320,879 B1 | | 11/2001 | Bremer ....................... | 370/493 |
| 6,353,664 B1 | * | 3/2002 | Cannon et al. .......... | 379/142.1 |
| 6,430,176 B1 | | 8/2002 | Christie, IV ............... | 370/355 |
| 6,574,335 B1 | * | 6/2003 | Kalmanek et al. ......... | 379/386 |
| 6,603,844 B1 | * | 8/2003 | Chavez et al. ......... | 379/114.13 |
| 6,778,648 B1 | * | 8/2004 | Alston et al. ............ | 379/93.27 |
| 2004/0120494 A1 | * | 6/2004 | Jiang et al. ............ | 379/210.01 |
| 2004/0196966 A1 | * | 10/2004 | Bushnell .................. | 379/88.19 |

FOREIGN PATENT DOCUMENTS

EP 1102514 5/2001

OTHER PUBLICATIONS

U.S. Appl. No. 10/172,257, filed Jun. 14, 2002, Colson et al.

\* cited by examiner

*Primary Examiner*—Wing Chan
*Assistant Examiner*—Aamir Haq
(74) *Attorney, Agent, or Firm*—Akerman Senterfitt

(57) ABSTRACT

A method for providing dynamic ringback services can include receiving a connection signal from an originating device and determining a receiving device specified by the connection signal. The method can access receiving device specific information and can dynamically generate a ringback transmission responsive to at least a portion of the receiving device specific information. The method can send this ringback transmission to the originating device before a connection is established between the originating device and the receiving device.

27 Claims, 2 Drawing Sheets

DYNAMIC RINGBACK SERVICES

BACKGROUND OF THE INVENTION

1. Technical Field

The present invention relates to the field of telecommunication and, more particularly, to pre-connection telecommunication activities.

2. Description of the Related Art

Whenever an originating telephony device (calling telephone) attempts to establish a connection with (calls) a receiving telephony device (called telephone), the originating device receives an audio tone sequence called a ringback that signifies the receiving device is ringing. This ringback is an analog signal generated by a telephony switch. Most commonly, the destination switch, the switch to which the receiving device is connected, generates the ringback signal. Notably, the originating switch and the destination switch can be a single switch to which both the originating and the receiving devices connect. Regardless of which switch actually generates the ringback, a back channel is present between the destination switch and the originating switch and between the originating switch and the originating device that is configured to transport the ringback signal.

Conventional systems generally utilize a recorded message to generate the analog ringback signal received by the originating device. This analog ringback signal is commonly a general purpose, predefined signal. Accordingly, the originating device can receive the same ringback signal from a given switch regardless of the receiving device contacted. Consequently, the owner of a receiving device cannot modify the ringback transmission sent to an originating device.

SUMMARY OF THE INVENTION

The invention disclosed herein provides a method and a system for dynamic ringback services. In particular, the method allows a user of a receiving telephony device (a called telephone) to modify the ringback signal sent by a destination telephony switch to an originating device (a calling telephone). This modified ringback signal, referred to as a dynamic ringback signal, can be an analog or a digital signal capable of relaying information to a user of the originating device. Significant connectivity information can be transported via dynamic ringback signals. For example, a dynamic ringback signal can specify the capabilities of a receiving device, allowing an originating device to maximize available connection capabilities.

One aspect of the present invention can include a method for dynamic ringback services. The method can include receiving a connection signal from an originating device and determining a receiving device specified by the connection signal. Additionally, the method can access receiving device specific information. For example, in one embodiment, a destination switch utilizing the method can query a receiving device for connectivity information, such as the capabilities of the receiving device. In another embodiment, the receiving device specific information can be stored in a data repository accessible across a network.

Next, the method can construct a ringback transmission responsive to at least a portion of the receiving device specific information. The ringback transmission can include a ringback signal, which is an intermittent audio tone that signifies to the originating device that a receiving device is ringing. Moreover, the ringback signal can be modified based upon the receiving device specific information pertaining to the originating device. For example, the receiving device information can include a list of family phone numbers and cause a family specific tone to be used as the ringback signal. In such an example, the method can determine a phone number associated with the originating device and modify at least a portion of the ringback transmission based upon this phone number.

The ringback transmission can also include a digital signal containing information other than an intermittent audio tone signifying to the originating device that a receiving device is ringing. For example, the digital signal can contain a message that can be conveyed to predefined class of callers. Notably, in one embodiment, the method can establish a connection across a public network, send a ringback transmission request to a network element, and receive the ringback transmission from the network element responsive to the ringback transmission request. Hence, the ringback transmission can be constructed by an application disposed outside a destination switch.

Once a ringback transmission has been constructed, the method can send the ringback transmission to the originating device. Notably, such a transmission can occur before a connection is established between the originating device and the receiving device. In one embodiment, the ringback transmission can be conveyed through a ringback channel within the frequency range of 300–2200 Hz. In another embodiment, the method can prevent the originating device from causing the receiving device to ring based upon receiving device specific information. For example, the receiving device can require an authorization key before a connection attempt is permitted.

Another aspect of the present invention can include a system for dynamic ringback messaging including a destination switch configured to provide a ringback transmission to an originating device. This ringback transmission can include an intermittent audio tone signifying to the originating device that a receiving device is ringing. Additionally, the ringback transmission can include a digital signal. Furthermore, the ringback transmission can be modified according to receiving device specific data.

In one embodiment, the system can include a ringback channel communicatively linking the originating device to the destination switch and capable of relaying the ringback transmission. In a particular embodiment, the ringback channel can be within the frequency range of 300–2200 Hz. In another embodiment, the system can include a ringback processor configured to be accessed by the destination switch across a network, wherein the ringback processor can contribute to the creation of the ringback transmission. Notably, the ringback processor can be a switch independent application.

BRIEF DESCRIPTION OF THE DRAWINGS

There are shown in the drawings embodiments, which are presently preferred, it being understood, however, that the invention is not limited to the precise arrangements and instrumentalities shown.

DETAILED DESCRIPTION OF THE INVENTION

The invention disclosed herein provides a method and a system for dynamic ringback telephony services. Specifically, the invention provides a means to convey data concerning a receiving device to an originating device before a connection is established between the two devices. To accomplish this goal, the invention replaces a pre-recorded analog ringback transmission with a dynamically generated transmission. Notably, the dynamic ringback transmission can contain both analog and digital signals. Furthermore, a user of a receiving device can modify receiving device specific information causing the ringback transmission received by the originating device to change.

Figure 1:
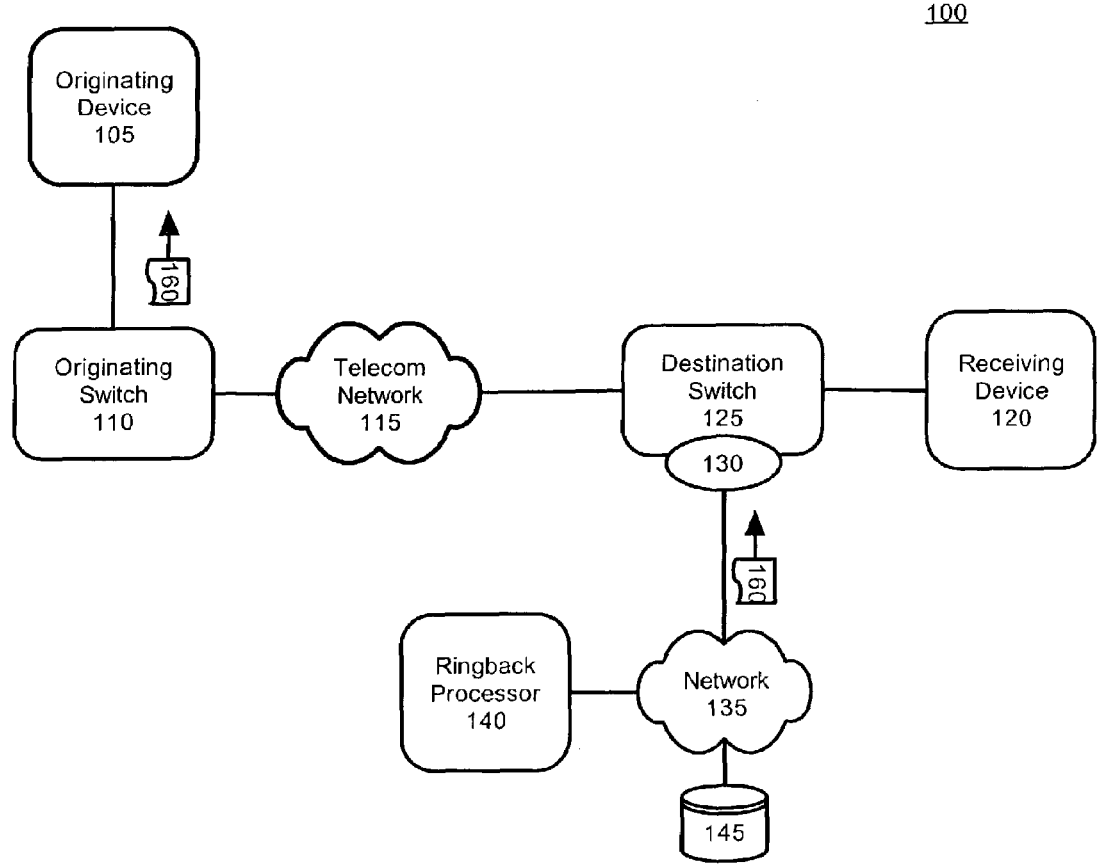
FIG. 1 is a schematic diagram illustrating an exemplary telephony system providing dynamic ringback services in accordance with the inventive arrangements disclosed herein.

FIG. 1 is a schematic diagram illustrating a telephony system 100 which can provide dynamic ringback services in accordance with the inventive arrangements disclosed herein. As shown in FIG. 1, the system 100 can include an originating switch 110, a ringback channel 165, a telecom network 115, a destination switch 125, and a ringback processor 140. The originating switch 110 can be a node within a telephony network that can facilitate the connection between telephony devices, such as telephones and other customer premise equipment.

Notably, switches, such as the originating switch 110 and the destination switch 125, can connect customer premise equipment to the telecom network 115. Hence, the originating switch 110 can connect an originating device 105 to the telecom network 115. Similarly, the destination switch 125 can be a node within the telecom network 115 communicatively linking a receiving device 120 to the telecom network 115. Since one switch can connect many telephony devices to a given network, both the originating device 105 and the receiving device 120 can be connected to the same switch, thusly the originating switch 110 and the destination switch 125 can be the same switch.

The telecom network 115 can be any series of points or nodes connected by a series of interconnection paths capable of connecting the originating switch 110 to the destination switch 125. For example, the telecom network 115 can be a circuit-switched network included within the public switched telephone network (PSTN). In another embodiment, the telecom network 115 can be a commercially owned proprietary packet-switched network with voice over Internet protocol (VOIP) capabilities.

The ringback channel 165 can be a segment of telephony bandwidth within the voice frequency range (0–3400 Hz) reserved for pre-connection transmissions between the originating switch 110 and the originating device 105. Exact bandwidth requirements for the ringback channel 165 can vary depending on the information transfer method used. For example, in one embodiment, an 1100 Hz tone is intermittently turned on and off, where an "on state" can represent a digital one, and an "off state" can represent a digital zero. In such an embodiment, the ringback channel 165 can be a very narrow channel including the 1100 Hz tone.

Another embodiment where the ringback channel 165 can be a very narrow channel occurs when phase key shifting (PKS) modulation is used. In such an embodiment, the frequency of a carrier wave remains a constant while the phase of the carrier wave is altered to convey information. In yet another embodiment, frequency key shifting (FKS) modulation can be used within the ringback channel 165. In FKS, two or more different frequencies are needed to convey information. For instance, embodiments utilizing FKS can use the frequencies of 300 Hz and 1100 Hz as well as the frequencies 1100 Hz and 2200 Hz. Accordingly, the available frequency range for the ringback channel 165 for such embodiments would be 300–1100 Hz and 1100–2200 Hz respectively. It should be noted that the frequency ranges specified above are for exemplary purposes and that other frequency ranges can be used. It can be advantageous, however, to keep the ringback channel 165 as narrow as possible to allow other signals to be transmitted along other channels within the voice band.

The network 135 can be any series of points or nodes connected by a series of interconnection paths capable of connecting destination switch 125 to ringback processor 140. For example, the network 135 can be the Internet. Alternately, the network 135 can be an intranet utilized by a telecom carrier that owns the destination switch 125. Additionally, a gateway 130 can be used to interface between the ringback processor 140 and the destination switch 125. In one embodiment, the gateway 130 can facilitate switch independent application programming by providing a set of open network application programming interfaces (APIs). These interfaces can translate standardized telephony commands to switch specific commands. Additionally, the gateway 130 can function as a layer of abstraction between a telephony network and an application, providing standardized routines to ease many programming tasks.

For example, in one embodiment, the gateway 130 can be a Parlay gateway capable of interfacing any Parlay compliant application to a Parlay compliant telecom network 115. In another embodiment, the gateway 130 can be a software platform, such as the IBM Resource Manager, that can provide the ringback processor 140 value-added telephony applications and services. In yet another embodiment, the gateway 130 can include Java APIs for Integrated Networks (JAIN®) allowing the ringback processor 140 to be implemented as a switch independent JAIN compliant application.

The ringback processor 140 can be an application capable of performing dynamic ringback services. More particularly, the ringback processor 140 can generate a ringback transmission 160. In one embodiment, the ringback processor 140 can be a network element that interfaces with the destination switch 125 through a gateway 130. In another embodiment, the ringback processor 140 can be a stand-alone solution interfacing directly with the destination switch 125 without utilizing gateway 130 as an intermediary. In yet another embodiment, the ringback processor 140 can be a program disposed within the destination switch 125. The ringback processor 140 can retrieve specific data concerning the receiving device 120 from a data store 145. For example, in one embodiment, the data store 145 can contain a lookup table with rules correlating phone numbers of originating devices with specialized actions to be taken by the ringback processor 140. Consequently, the ringback processor can send different ringback transmissions to different originating devices attempting to establish contact with the same receiving device.

The ringback transmission 160 can be the transmission generated by the ringback processor 140 and relayed to the originating device 105. Notably, the ringback transmission 160 can include both digital and/or analog signals. One particular analog signal, a ringback signal, can be a sequence of intermittent audio tones that can be sent to the originating device 105 to signify that the receiving device 120 is ringing. Unlike a conventional analog ringback signal, the ringback signal of the ringback transmission 160 can be altered according to specifications defined by a user of the receiving device 120. Such specifications are stored in a location accessible by the ringback processor 140. For example, in one embodiment, the user of receiving device 120 can specify that all generated ringback signals include a customized melody. In another embodiment, the user can specify that a particular subset of originating devices, such as those belonging to family, are to receive one predefined ringback signal and all other originating devices are to receive a different predefined ringback signal.

Digital signals within the ringback transmission 160 can convey connectivity information to the originating device 105. For example, in one embodiment, a digital signal can convey a called person ID (the reverse of caller ID) to the originating device 105. This called person ID can be useful in situations where a user of the originating device 105 has been transferred to an unknown phone number. Additionally, a called person ID can present the name of the person called to a caller. In another embodiment, a digital signal within the ringback transmission 160 can contain information concerning the capabilities of the receiving device 120.

In operation, the originating device 105 can place a call to the receiving device 120 utilizing a telephony network, such as a public switched telephone network (PSTN). The originating device 105 can send a connectivity request through the originating switch 110 across the telecom network 115 to the destination switch 125. Notably, when both the originating device 105 and the receiving device 120 are connected to the same switch, the connectivity request can be handled directly by that switch, which can function as both the originating switch 110 and the destination switch 125. The destination switch 125 can then send a ringback transmission request to the ringback processor 140. Optionally, the destination switch 125 can query the receiving device 120 and relay any discovered information to the ringback processor 140. Additionally, the gateway 130 can optionally facilitate information exchanges between the destination switch 125 and the ringback processor 140.

The ringback processor can utilize receiver specific information to construct the ringback transmission 160. This receiver specific information can be stored in an external data store, such as data store 145, contained within the ringback processor 140, or sent to the ringback processor 140 from the destination switch 125 along with a request to construct a ringback transmission. Once created, the ringback transmission 160 can be relayed through the network 135, the destination switch 125, and the telecom network 115 to the originating switch 110. The originating switch 110 can then utilize the ringback channel 165 to send the ringback transmission 160 to the originating device 105.

Figure 2:
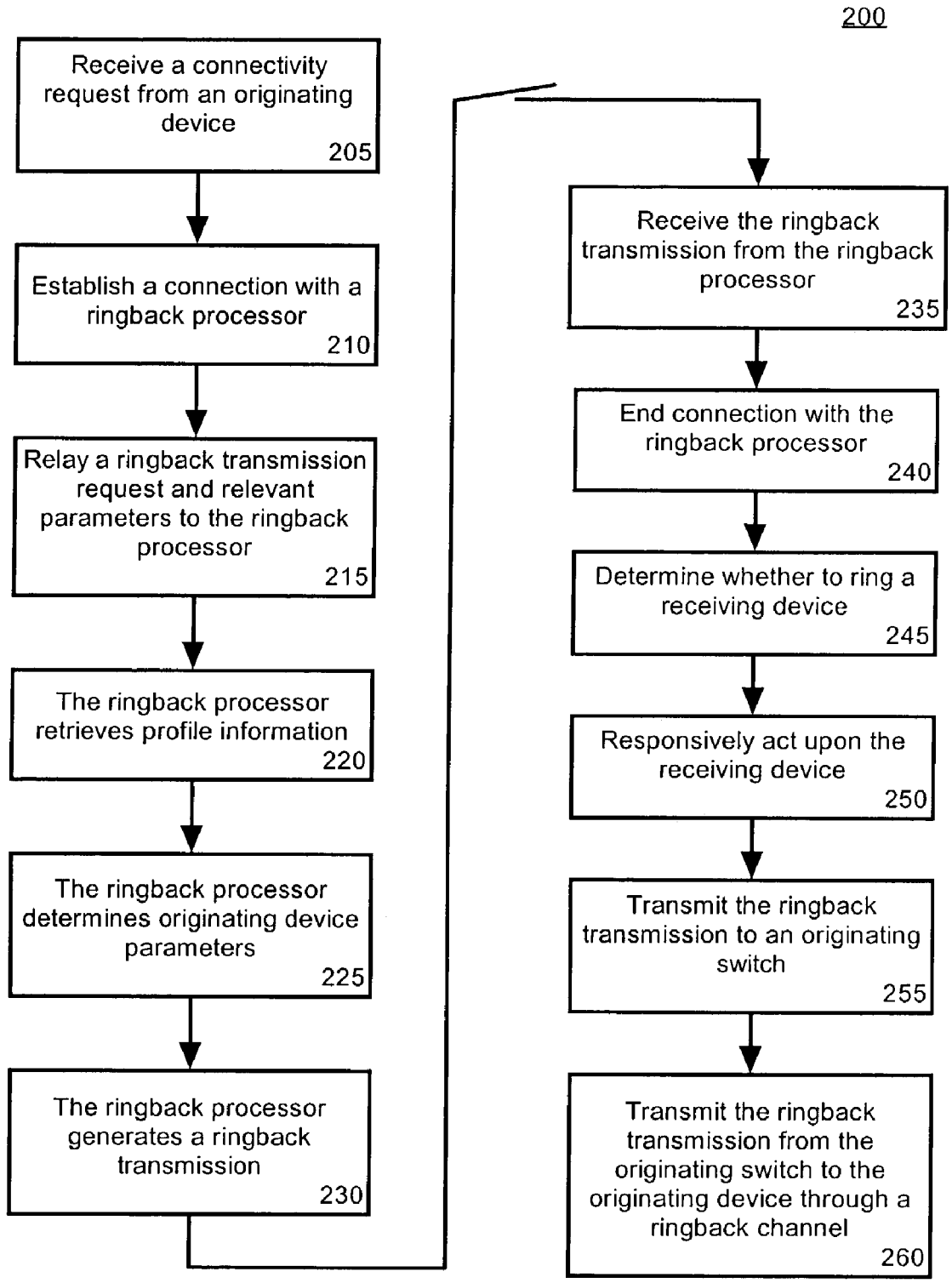
FIG. 2 is a flow chart illustrating a method for implementing dynamic ringback services using the system of FIG. 2.

FIG. 2 is a flow chart illustrating a method 200 for implementing dynamic ringback services using the system of FIG. 1. The method 200 can be performed in the context of an attempted telephony connection. The method 200 begins in a state before a connection is established between an originating device and a receiving device. The method assumes that a telephony environment exists where a communication pathway is available to a destination switch through which the destination switch can relay a ringback transmission to an originating device.

The method 200 can begin in step 205, where a destination switch receives a connectivity request from the originating device. While in many cases, the connectivity request will be for a dedicated circuit-switched voice connection, the method can operate equally as well within a packet-switched environment. In step 210, a connection with a ringback processor and the originating device can be established. In one embodiment, the ringback processor can be a network element that can be accessed directly across a network. In another embodiment, the ringback processor can be an application disposed within the destination switch. In yet another embodiment, the method can utilizes a gateway to facilitate transmissions between a telephony switch and the ringback processor. For example, a Parlay gateway can be used as an interface between a telephony switch and a Parlay compliant ringback processing application. In another example, the IBM Resource Manager can act as a gateway.

In step 215, a ringback transmission request and relevant parameters can be relayed to the ringback processor from the destination switch. Relevant parameters can include, but are not limited to, originating device identification parameters, receiving device parameters available to the destination switch, and special processing parameters related to the ringback transmission request. In step 220, the ringback processor can retrieve profile information concerning the receiving device. For example, profile information can include, but is not limited to, such information as the name of the called party, capabilities of the called device, receiving device preferences, security requirements for establishing a connection, and unique connection requirements. The profile information can be located in an external data store, can be contained within the ringback processor, or can be contained within parameters passed to the ringback processor.

In step 225, the ringback processor can determine originating device parameters based upon the phone number of the originating device. In one embodiment, profile information can specify one type of ringback signal for designated originating devices, such as those belonging to specified family members, and another type of ringback signal for everyone else. In another embodiment, digital signals, such as text messages, can vary depending on the originating device. Consequently, step 225 can be necessary depending on the ringback processing options established for a particular receiving device.

In step 230, the ringback processor can generate a ringback transmission. This ringback transmission can include analog and/or digital signals. Typically, an analog ringback signal will be generated at this step to indicate to an originating device that a receiving device is ringing. In the event that no connection attempt is to be made with the specified receiving device, no such analog ringback signal is necessary. As previously mentioned, the ringback signal can be modified based on the identity of the originating device. Additionally, digital signals containing such information as the identity of the receiving device and receiving device capabilities can be included within the ringback transmission.

In step 235, the ringback processor can send the ringback transmission to the destination switch. Thereafter, in step 240 the connection with the ringback processor can be terminated. In step 245, the method can determine whether to ring the receiving device based on information provided by the ringback processor. Once the determination is made, the method can proceed to step 250, where the destination switch can responsively act upon the receiving device. In step 255, the ringback transmission can be relayed through the telephony network to the originating switch. Notably, if the originating device and receiving device are both connected to the same switch, step 255 is unnecessary. In step 260, the originating switch can transmit the ringback transmission to the originating device through a designated ringback channel. This ringback channel can be a frequency range within the voice band designated for ringback transmissions.

The present invention can be realized in hardware, software, or a combination of hardware and software. The present invention can be realized in a centralized fashion in one computer system or in a distributed fashion where different elements are spread across several interconnected computer systems. Any kind of computer system or other apparatus adapted for carrying out the methods described herein is suited. A typical combination of hardware and software can be a general-purpose computer system with a computer program that, when being loaded and executed, controls the computer system such that it carries out the methods described herein.

The present invention also can be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

This invention can be embodied in other forms without departing from the spirit or essential attributes thereof. Accordingly, reference should be made to the following claims, rather than to the foregoing specification, as indicating the scope of the invention.

What is claimed is:

1. A method for dynamic ringback services comprising the steps of:
   receiving a connection signal from an originating device;
   determining a receiving device specified by said connection signal;
   accessing pre-stored receiving device specific information, said receiving device specific information associating with different subsets of a plurality of originating devices different rules for performing ringback transmissions based upon which subset a particular one of the plurality of originating devices attempting to establish contact with the receiving device belongs to, the different subsets being pre-specified by a user of the receiving device;
   correlating said receiving device specific information with said originating device based upon which subset said originating device belongs to;
   dynamically constructing a ringback transmission responsive to at least a portion of said receiving device specific information; and,
   sending said ringback transmission to said originating device before a connection is established between said originating device and said receiving device.

2. The method of claim 1, wherein said constructing step further comprises the steps of:
   determining a called person identification phone number associated with a transferred connection from said originating device to said receiving device; and,
   modifying at least a portion of said ringback transmission responsive to said called person identification phone number.

3. The method of claim 1, further comprising the steps of:
   including within said ringback transmission a plurality of key shift modulation signals, wherein said plurality of key shift modulation signals comprises a ringback signal; and,
   utilizing said ringback signal to present an intermittent audio tone to an originating device, wherein said intermittent audio tone signifies to said originating device that a receiving device is ringing.

4. The method of claim 2, wherein said constructing step further comprises the steps of
   including within said ringback transmission a key shift modulated ringback signal; and
   utilizing said key shift modulated ringback signal to present an intermittent audio tone to an originating device, wherein said intermittent audio tone signifies to said originating device that a receiving device is ringing, wherein said modifying step alters characteristics of said ringback signal, whereby a different tone may be played for specific callers.

5. The method of claim 1, further comprising the steps of:
   including within said ringback transmission a key shift modulated digital signal; and,
   utilizing said digital transmission to present information to said originating device, wherein said information comprises information other than an intermittent audio tone signifying to said originating device that a receiving device is ringing.

6. The method of claim 5, wherein said key shift modulated digital signal is modified based upon said receiving device specific information pertaining to said originating device, whereby a special message may be a conveyed to a predefined group of callers.

7. The method of claim 1, said constructing step further comprising the steps of:
   establishing a connection across a public network;
   sending a key shift modulated ringback transmission request to a network element; and,
   receiving said key shift modulated ringback transmission from said network element responsive to said ringback transmission request.

8. The method of claim 1, further comprising the step of authorizing said originating device to ring based upon said receiving device specific information.

9. The method of claim 1, further comprising the steps of:
   querying a receiving device for connectivity information; and,
   utilizing said connectivity information within said constructing step.

10. The method of claim 1, wherein said sending step utilizes a ringback channel for conveying said ringback transmission,
    wherein said ringback channel is within the frequency range of 300–2200 Hz.

11. A system for dynamic ringback messaging comprising:
    a ringback processor communicatively linked to a telephony network configured to provide a ringback transmission to an originating device;
    wherein said ringback processor is configured to access stored receiving device specific information that associates with different subsets of a plurality of originating devices different rules for performing ringback transmissions based upon which subset a particular one of a plurality of originating devices attempting to establish contact with the receiving device belongs to, said different subsets being pre-specified by a user of a receiving device called by said originating device;
    said ringback processor being further configured to dynamically generate said ringback transmission to said originating device based upon said device specific information according to which subset said originating device belongs to.

12. The system of claim 11, wherein said ringback transmission represents an intermittent audio tone signifying to said originating device that said particular receiving device is ringing.

13. The system of claim 11, wherein said ringback transmission is a digital signal.

14. The system of claim 11, further comprising a ringback channel communicatively linking said originating device to said ringback processor, wherein said ringback channel is configured to transport said ringback transmission using one of a frequency shift keying (FSK) or phase shift keying (PSK) modulation.

15. The system of claim 14, wherein said ringback channel supports key shifting modulation within the frequency range of 300–2200 Hz.

16. The system of claim 11, wherein said ringback processor is a network element within a telephony network.

17. The system of claim 16, wherein said ringback processor is a switch independent application.

18. A computer readable medium, having stored thereon a computer program having a plurality of code sections executable by a computer for causing the computer to perform the steps of:
receiving a connection signal from an originating device;
determining a receiving device specified by said connection signal;
accessing pre-stored receiving device specific information, said receiving device specific information associating with different subsets of a plurality of originating devices different rules for performing ringback transmissions based upon which subset a particular one of the plurality of originating devices attempting to establish contact with the receiving device belongs to, the different subsets being pre-specified by a user of the receiving device;
correlating said receiving device specific information with said originating device based upon which subset said originating device belongs to;
dynamically constructing a ringback transmission responsive to at least a portion of said receiving device specific information; and,
sending said ringback transmission to said originating device before a connection is established between said originating device and said receiving device.

19. The computer readable medium of claim 18, wherein said constructing step further comprises the steps of:
determining a called person identification phone number associated with a transferred connection from said originating device to said receiving device; and,
modifying at least a portion of said ringback transmission responsive to said called person identification phone number.

20. The computer readable medium of claim 18, further comprising the steps of:
including within said ringback transmission a plurality of key shift modulation signals, wherein said plurality of key shift modulation signals comprises a ringback signal; and,
utilizing said ringback signal to present an intermittent audio tone to an originating device, wherein said intermittent audio tone signifies to said originating device that a receiving device is ringing.

21. The computer readable medium of claim 19, wherein said constructing step further comprises the steps of
including within said ringback transmission a key shift modulated ringback signal; and
utilizing said key shift modulated ringback signal to present an intermittent audio tone to an originating device, wherein said intermittent audio tone signifies to said originating device that a receiving device is ringing, wherein said modifying step alters characteristics of said ringback signal, whereby a different tone may be played for specific callers.

22. The computer readable medium of claim 18, further comprising the steps of:
including within said ringback transmission a key shift modulated digital signal; and,
utilizing said digital transmission to present information to said originating device, wherein said information comprises information other than an intermittent audio tone signifying to said originating device that a receiving device is ringing.

23. The computer readable medium of claim 22, wherein said key shift modulated digital signal is modified based upon said receiving device specific information pertaining to said originating device, whereby a special message may be a conveyed to a predefined group of callers.

24. The computer readable medium of claim 18, said constructing step further comprising the steps of:
establishing a connection across a public network;
sending a key shift modulated ringback transmission request to a network element; and,
receiving said key shift modulated ringback transmission from said network element responsive to said key shift modulated ringback transmission request.

25. The computer readable medium of claim 18, further comprising the step of authorizing said originating device to ring based upon said receiving device specific information.

26. The computer readable medium of claim 18, further comprising the steps of:
querying a receiving device for connectivity information; and,
utilizing said connectivity information within said constructing step.

27. The computer readable medium of claim 18, wherein said sending step utilizes a ringback channel for conveying said ringback transmission, wherein said ringback channel is within the frequency range of 300–2200 Hz.

* * * * *